United States Patent [19]

Sawicki et al.

[11] 3,845,484

[45] Oct. 29, 1974

[54] SIGNAL GENERATOR FOR TESTING VOR NAVIGATION RECEIVERS

[75] Inventors: Joseph J. Sawicki, Lighthouse Pt.; Charles D. Talbert, Ft. Lauderdale, both of Fla.

[73] Assignee: The Bendix Corporation, Southfield, Mich.

[22] Filed: June 12, 1973

[21] Appl. No.: 369,336

[52] U.S. Cl. ............... 343/106 R, 325/67, 325/363, 343/17.7

[51] Int. Cl. ........................... G01s 7/40, G01s 1/44

[58] Field of Search .......... 343/17.7, 106 R; 325/67, 325/363

[56] References Cited

UNITED STATES PATENTS

| | | | |
|---|---|---|---|
| 2,912,688 | 11/1959 | De Faymoreau et al. | 343/106 R |
| 3,312,972 | 4/1967 | Alitz | 343/17.7 |
| 3,358,284 | 12/1967 | Millar et al. | 343/106 R |
| 3,369,238 | 2/1968 | Stauffer et al. | 343/106 R |
| 3,743,971 | 7/1973 | Hemme | 343/106 R |

*Primary Examiner*—Maynard R. Wilbur
*Assistant Examiner*—G. E. Montone
*Attorney, Agent, or Firm*—Bruce L. Lamb; W. G. Christoforo

[57] ABSTRACT

An audio frequency signal generator for an amplitude and frequency modulated composite signal of the format used in VOR Navigation Systems. Digital phase shaft means and internal error corrective feedback enables generation of selected bearing signals accurate to 0.01°. Means are provided for monitoring f.m. deviation ratio and generator runout.

13 Claims, 7 Drawing Figures

PATENTED OCT 29 1974

3,845,484

SHEET 1 OF 5

OUTPUTS OF D AND E SEGMENTS OF SWITCH 22

| | 0° | 10° | 20° | 70° | 100° | 120° | 180° | 190° | 200° | 220° | 250° | 280° | 300° |
|---|---|---|---|---|---|---|---|---|---|---|---|---|---|
| $D_1$ | 1 | 0 | 1 | 0 | 1 | 1 | 1 | 0 | 1 | 1 | 0 | 1 | 1 |
| $D_2$ | 1 | 1 | 0 | 0 | 1 | 0 | 1 | 1 | 1 | 0 | 1 | 1 | 1 |
| $D_4$ | 1 | 1 | 1 | 0 | 1 | 1 | 1 | 1 | 1 | 1 | 0 | 1 | 1 |
| $D_8$ | 1 | 1 | 1 | 1 | 1 | 1 | 0 | 0 | 1 | 1 | 1 | 0 | 1 |
| $E_1$ | 1 | 1 | 1 | 1 | 0 | 0 | 0 | 0 | 1 | 1 | 1 | 1 | 0 |
| $E_2$ | 1 | 1 | 1 | 1 | 1 | 1 | 1 | 1 | 0 | 0 | 0 | 0 | 0 |

NUMBER OF INPUT PULSES TO DIVIDER 16

| INPUT TO GATES | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| 101A | 0 | 1 | 0 | 1 | 0 | 1 | 0 | 1 | 0 | 1 | 0 | 1 | 0 | 1 | 0 | 1 | 0 | 1 | 0 |
| 101B | 0 | 0 | 1 | 1 | 0 | 0 | 1 | 1 | 0 | 0 | 0 | 0 | 1 | 1 | 0 | 0 | 1 | 1 | 0 |
| 101C | 0 | 0 | 0 | 0 | 1 | 1 | 1 | 1 | 0 | 0 | 0 | 0 | 0 | 0 | 1 | 1 | 1 | 1 | 0 |
| 101D | 0 | 0 | 0 | 0 | 0 | 0 | 0 | 0 | 1 | 1 | 0 | 0 | 0 | 0 | 0 | 0 | 0 | 0 | 0 |
| 109 | 0 | 0 | 0 | 0 | 0 | 0 | 0 | 0 | 0 | 0 | 1 | 1 | 1 | 1 | 1 | 1 | 1 | 1 | 0 |

| OUTPUT OF GATE | PHASE ANGLE SELECTED | | | | | | | | | | | |
|---|---|---|---|---|---|---|---|---|---|---|---|---|
| | 0 | 10 | 20 | 70 | 100 | 120 | 180 | 190 | 200 | 250 | 280 | 300 |
| 102A | 0 | 0 | 1 | 1 | 0 | 0 | 0 | 0 | 0 | 1 | 0 | 0 |
| 102B | 0 | 0 | 0 | 0 | 0 | 0 | 1 | 1 | 0 | 0 | 1 | 0 |
| 103 | 0 | 0 | 0 | 0 | 1 | 1 | 1 | 1 | 1 | 1 | 1 | 0 |
| 104A | 0 | 0 | 0 | 0 | 0 | 0 | 0 | 0 | 1 | 1 | 0 | 1 |
| 104B | 0 | 0 | 0 | 0 | 0 | 0 | 0 | 0 | 0 | 0 | 0 | 0 |
| 105 | 1 | 1 | 1 | 1 | 1 | 1 | 0 | 0 | 1 | 1 | 0 | 1 |
| 108A | 1 | 1 | 0 | 0 | 1 | 0 | 1 | 1 | 0 | 0 | 1 | 0 |
| 108B | 1 | 1 | 1 | 0 | 1 | 1 | 1 | 1 | 1 | 0 | 1 | 1 |
| 106A | 1 | 1 | 0 | 1 | 1 | 1 | 1 | 1 | 1 | 1 | 1 | 1 |
| 106B | 0 | 0 | 1 | 0 | 0 | 0 | 1 | 1 | 0 | 0 | 1 | 0 |
| 107 | 0 | 0 | 0 | 0 | 0 | 0 | 1 | 1 | 0 | 0 | 1 | 0 |
| 108D | 1 | 1 | 1 | 1 | 0 | 0 | 1 | 1 | 1 | 1 | 0 | 0 |
| 108C | 1 | 1 | 1 | 1 | 1 | 1 | 1 | 1 | 1 | 1 | 0 | 1 |
| 101A | 1 | 0 | 1 | 0 | 1 | 1 | 1 | 0 | 1 | 0 | 1 | 1 |
| 101B | 1 | 1 | 0 | 0 | 1 | 0 | 1 | 1 | 0 | 0 | 1 | 0 |
| 101C | 1 | 1 | 1 | 0 | 1 | 1 | 1 | 1 | 1 | 0 | 1 | 1 |
| 101D | 1 | 1 | 1 | 1 | 1 | 1 | 1 | 1 | 1 | 1 | 0 | 1 |
| 109 | 1 | 1 | 1 | 1 | 0 | 0 | 1 | 1 | 1 | 1 | 0 | 0 |
| 110 | 0 | 0 | 0 | 0 | 1 | 1 | 0 | 0 | 0 | 0 | 1 | 1 |
| 114 | 0 | 0 | 0 | 0 | 0 | 0 | 1 | 1 | 0 | 0 | 0 | 0 |
| 115 | 1 | 1 | 1 | 1 | 1 | 1 | 0 | 0 | 1 | 1 | 1 | 1 |
| 116 | 0 | 0 | 0 | 0 | 0 | 0 | 1 | 1 | 1 | 1 | 1 | 1 |
| 117B | 0 | 0 | 0 | 0 | 0 | 0 | 0 | 0 | 0 | 0 | 0 | 0 |
| 117A | 0 | 0 | 0 | 0 | 0 | 0 | 1 | 1 | 1 | 1 | 1 | 1 |

FIG. 6

SIGNAL GENERATOR FOR TESTING VOR NAVIGATION RECEIVERS

The present invention relates to audio frequency signal generators particularly adapted to use in testing and calibrating radio receivers for VOR aircraft navigation systems.

The VOR navigation system is a standard enroute navigational aid for aircraft. It provides continuously and automatically true bearings of an aircraft from or to a VOR ground station thereby enabling the pilot of the aircraft to determine position or set course rapidly and accurately. In the VOR system a ground-based transmitter broadcasts by a rotating directional antenna a carrier in the VHF frequency band which is amplitude modulated by an audio subcarrier of 9,960 Hz, which, in turn, is frequency modulated at 30 Hz. The transmitting antenna rotating at a rate of 30 Hz imparts overall amplitude modulation at that frequency to the subcarrier modulated carrier thereby producing at the output of an a.m. detector in a remotely located aircraft radio receiver a composite audio signal comprising the 9,960 Hz frequency modulated subcarrier with 30 Hz amplitude modulation from the rotating antenna. The 30 Hz a.m. and 9,960 Hz f.m. components are separated by filters and the latter component is frequency demodulated to produce a 30 Hz reference signal. The transmitter f.m. generator and antenna are coupled together so that the 30 Hz f.m. and a.m. signals are in phase when the transmitter antenna is pointing north. A receiver located at any other bearing from the transmitter than north will produce 30 Hz signals from the f.m. and the a.m., the latter being known as the variable signal, which differ in phase an amount ideally corresponding to the azimuth of the receiver. The complete airborne VOR system therefore includes, in addition to the receiver and demodulators providing the 30 Hz reference and variable signals, means for measuring the phase difference between the recovered reference and variable signals and for indicating the measured phase difference either as a course deviation or an angular bearing.

Although the signal received from a VOR transmitter may be in error due to faulty transmitting apparatus or vagaries of propagation, the receiving apparatus can introduce error independently of the quality of the transmitted signal. It is important therefore during manufacture and later in service to test operation of VOR receivers to insure that this equipment is within specifications. Newer equipment is capable of measuring bearings to accuracies of better than ±0.5° throughout the entire 360° range of bearings. A signal generator serving as a calibration standard should be at least ten times more accurate than the equipment under test. Prior generators, patterned after the modulation generators used in VOR transmitters, are incapable of meeting or maintaining such a requirement.

In the VOR transmitter the reference signal is generated by a tone wheel having teeth at various spacings calculated to produce the 9,960 subcarrier frequency modulated at a deviation ratio of 16 when driven synchronously with the antenna at 30 Hz. This method appears to provide reliable and sufficiently accurate synchronization between the reference and variable signals for transmitting purposes. When adapted as a signal generator, however, the method is inflexible as to control of deviation ratio, subcarrier frequency and phasing between reference and variable signals. If the subcarrier frequency and deviation ratio should prove inaccurate, correction can only be accomplished by remanufacturing the tone wheel. Phasing between reference and variable signals is usually controlled by an electromechanical resolver which is seldom more accurate than ±1° throughout the 360° range.

It is an object of the present invention to provide an audio signal generator having an output usable for test and calibration of VOR apparatus.

It is another object of the invention to provide a signal generator providing VOR type modulation signals in which the phasing between reference and variable signals thereof may be precisely adjusted in increments throughout a 360° range and in which stability and synchronism of the signals is maintained by closed loop feedback methods.

A further object of the invention is to provide a signal generator for VOR type modulation signals in which the deviation ratio of the f.m. reference signal is continuously monitored and convenient means for the adjustment of the same are provided.

Another object of the invention is to provide a signal generator for VOR type modulation signals having means for monitoring and displaying continuously any phasing error between the reference and variable signals thereof.

These and other objects will be appreciated as an understanding of the invention is gained from the following detailed description thereof and the accompanying drawings.

Briefly, the invention comprises a generator for VOR type modulation signals in which 30 Hz signals for amplitude and frequency modulating the 9,960 Hz subcarrier are derived from a single precision oscillator operating at a frequency of 4.32 MHz. A digital phase shifter, which may be adjusted in increments of 0.01°, is interconnected with frequency dividing stages operating on the 4.32 Hz signal to provide two 30 Hz signals, one of which becomes the reference signal and the other the variable signal, shifted in phase a desired amount. The 30 Hz reference signal frequency modulates a 9,960 Hz voltage controlled oscillator (VCO) and also serves as a reference against which a 30 Hz sub-harmonic of the 9,960 Hz VCO output is phase locked. The deviation of the 9,960 Hz VCO output is determined by digitally comparing the phase difference between a half-cycle of the 30 Hz frequency modulating signal and a half-cycle of the 30 Hz subharmonic of VCO output. The 9,960 Hz f.m. output is filtered and combined with the phase shifted 30 Hz signal to produce a composite audio signal typical of the signal which would appear at the detector of a radio receiver located at the same bearing relative to a VOR transmitter as that selected on the digital phase shifter.

In order to test the radio frequency portions of a receiver, the composite signal output is not applied directly to the audio circuits of the receiver following the r.f. detector thereof but is used rather to modulate an external r.f. generator. The r.f. generator may introduce errors in the modulated r.f. signal applied to test a receiver. Consequently, the modulated r.f. signal is detected at the r.f. generator and returned as an audio composite signal for comparison with the original composite signal to monitor runout or error between the two. A phase shifter controlled by output of the runout monitor automatically adjusts phasing of the 30 Hz variable signal in the composite signal applied to the r.f. generator to compensate for errors originating therein. Alternatively, the runout monitor may be used to determine and display any error in the composite signal originally applied to the external r.f. generator.

In the drawings:

FIGS. 1A and 1B, assembled in tandem, are a functional block diagram of the invention;

FIG. 2 is a schematic diagram, including portions represented by functional blocks, of the frequency modulated voltage controlled oscillator used in the invention;

FIGS. 4, 5 and 6 are truth tables helpful in explaining the operation of the invention.

Figure 1A:
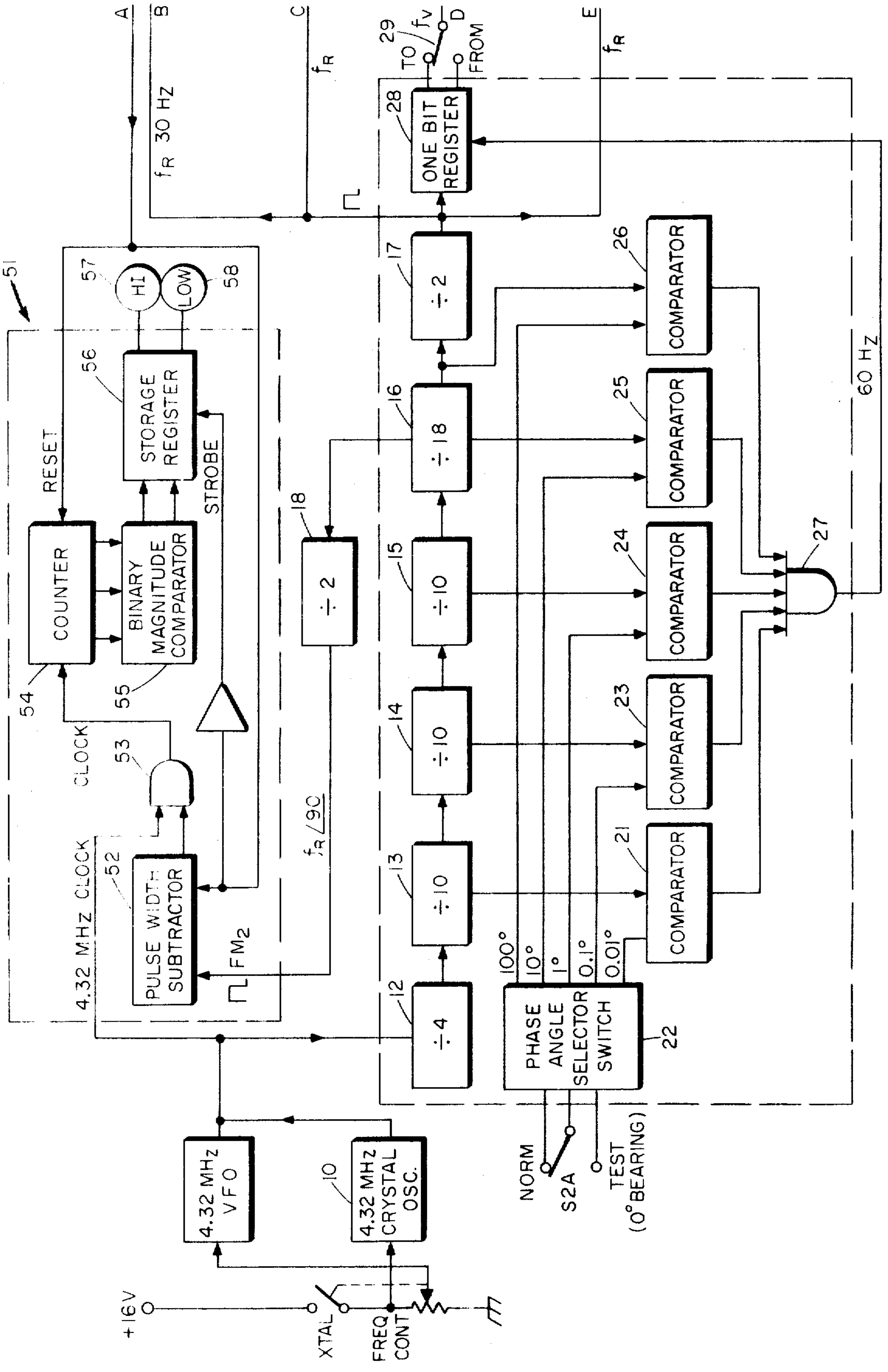
Figure 1B:
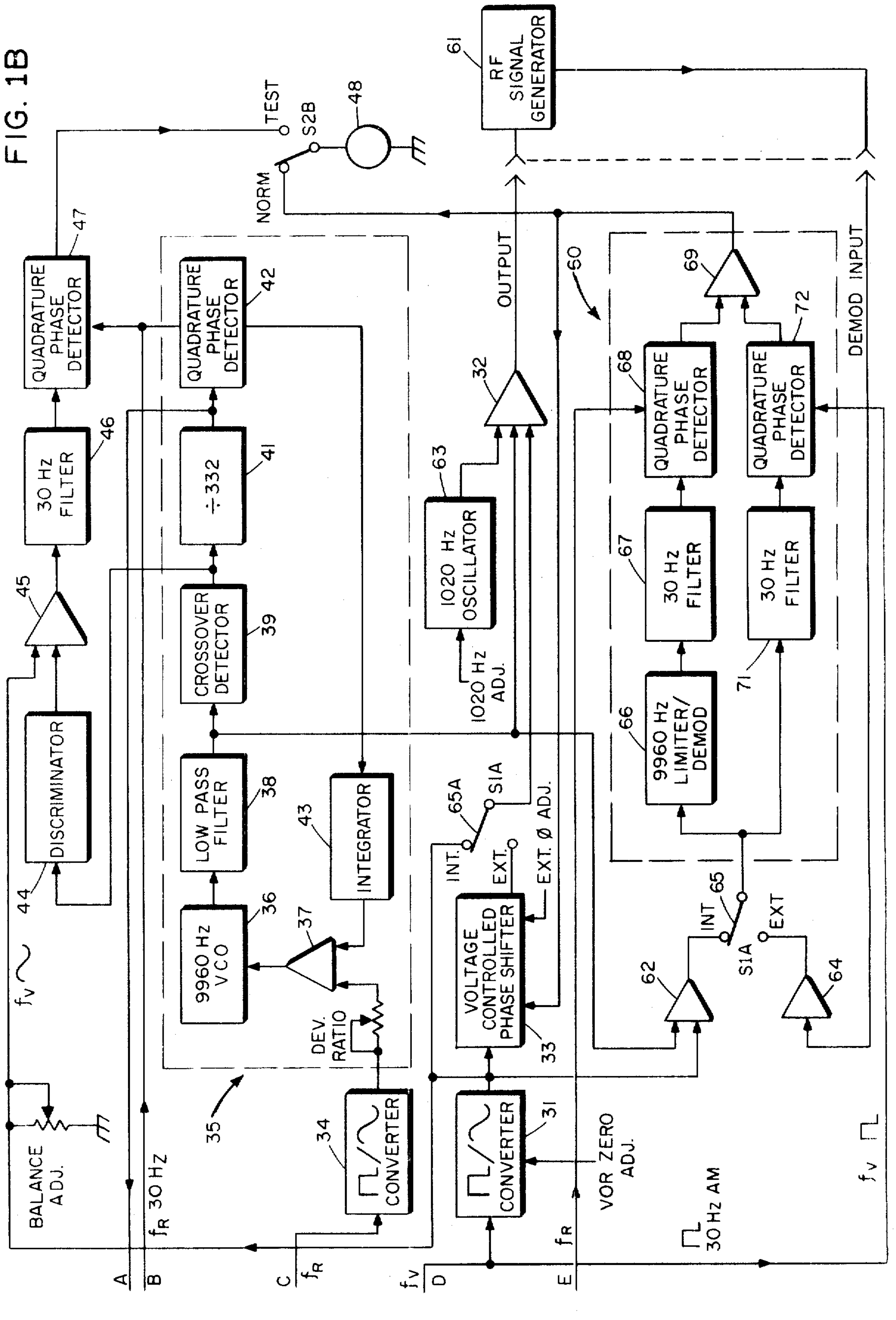

Referring to FIG. 1, the source of 30 Hz variable and reference signals is a 4.32 MHz crystal controlled oscillator 10 which is divided in successive binary divider stages 12–16 by a total factor of $7.2 \times 10^4$. This produces a frequency at the output of divider 16 of 60 Hz which is further divided by 2 in separate dividers 17, 18 to a frequency of 30 Hz. The output of divider 17 constitutes the reference signal, $f_r$, while the output of divider 18, $f_r \angle 90°$, is in quadrature therewith. The quadrature relationship between the outputs of dividers 17 and 18 is obtained by applying 60 Hz inputs thereto which are complementary or 180° out of phase. Divider 12 divides the 4.32 MHz input by a factor of 4, producing 1.08 MHz input to divider 13. The phase of a 30 Hz signal rotates through 30 × 360°/S= 10,800°/S. Resolving this total phase into 0.01° units demands the 1.08 MHz frequency input to divider 13. Divider 13 has a total capacity of 10 digits thus furnishing input to divider 14 at a frequency of 108 KHz. Intermediate stages of divider 13 are connected by a group of four logic lines to provide a binary coded decimal, BCD, representation of the count contained therein at any instant to a digital comparator 21. Comparator 21 is preconditioned by one segment of a manual phase angle selector switch 22 to produce an output whenever the count in divider 13 reaches the selected value. Since divider 15 is operating with input frequency of 1.08 MHz the segment of switch 22 controlling comparator 21 is graduated in units of 0.01°.

Binary divider 14 divides the input frequency of 108 KHz by a factor of 10 to produce an output at a frequency of 10.8 KHz. Like divider 13, intermediate stages of divider 14 are connected by four logic lines to a digital comparator 23 which is preset to a number selected on another segment of switch 22 graduated in units of 0.1°. Divider 15 again divides the input frequency by a factor of 10 to produce output at 1.08 KHz. It, too, is connected by four logic lines to a binary comparator preset by a segment of switch 22 graduated in units of 1°. Divider 16 divides the 1.08 KHz by a factor of 18 to produce a 60 Hz output.

Comparator 25 is connected by four logic lines with intermediate stages of divider 16 which is preset from a segment of switch 22 divided in units of 10°. The 60 Hz output of divider 16 represents 180° of phase of the 30 Hz $f_r$ signal. The logic controlling the binary comparators is so arranged that for selected phase differences of between 0°–180° incremental elements of phase are accumulated until the sum equals the selected phase angle. For $f_r$ and $f_v$ phase differences selected between 180°–360° the comparators are preset to accumulate phase increments totaling the difference between the selected phase angle and 180°. Comparator 26 performs this function, receiving the output of divider 16 and control from a segment of switch 22 graduated in units of 100°.

The 60 Hz output of divider 16 is divided by 2 in divider 17 to provide the 30 Hz $f_r$ signal. The outputs of comparators 21, 23–26 are combined in an AND gate 27 to produce clock pulses for toggling a one bit register 28 which receives as input the 30 Hz $f_r$ signal from divider 17. Clock pulses from gate 27 occur at the rate of 60 Hz and serve to set the state of the output of register 28 to that of $f_r$. A logic circuit (not shown in FIG. 1) inverts the output of register 28 for phase angle selections between 180° and 360°, thereby providing an additional 180° phase shift which, added to the difference between the selected phase and 180° produced by AND gate 27 for angles greater than 180°, produces a total phase shift equal to the angle selected on switch 22. The output of register 28 is a square wave constituting the variable signal, $f_v$ , which differs in phase from the square wave at the output of divider 17 by the amount selected on switch 22.

For bearings of the VOR receiver FROM the station the phase difference between $f_r$ and $f_v$ corresponds to the azimuth. For bearings of the VOR receiver TO the station the bearing angle indicated by the receiver must be 180° greater than the azimuth. That is, if the receiver is located due north of the station and is set to display bearing FROM the station, the bearing indicator will display directly the phase difference measured between $f_r$ and $f_v$, i.e., 0°. For receiver bearing indications TO the station the variable signal must be inverted prior to display of the $f_r$ and $f_v$ phase difference. If the receiver is on the north radial from the station and is set to display bearing TO, the $f_r$ and $f_v$ signals arrive at the receiver in phase but inversion of $f_v$ will cause the receiver to display 180° bearing TO. A TO-FROM selector switch 29 selects output from register 28 or the inverse thereof for application to a square wave to sine wave converter 31.

The output of converter 31 may either be applied directly to the summing amplifier 32 which acts as an amplitude modulator for the 9,960 Hz subcarrier or it may be first passed through a voltage controlled phase shifter 33 which is automatically adjusted as later described to compensate for external phase errors. The $f_r$ square wave from divider 17 is shaped into a sine wave in converter 34, the output of which frequency modulates the 9,960 Hz subcarrier generator 35. Generator 35 includes a VCO 36 having a nominal frequency of 9,960 Hz. The actual frequency of VCO 36, however, depends upon the amplitude of a control voltage applied thereto from a summing amplifier 37. Output of oscillator 36 is filtered to eliminate distortion products in a low pass filter 38. The sine wave output of filter 38 is converted to a square wave in the crossover detector 39. The frequency of the square wave from detector 39 is divided by a factor of 332 in divider 41. Although the frequency of VCO 36 deviates ±480 Hz, the average value thereof should remain at 9,960 Hz. The output of divider 41 then should be a 30 Hz square wave in quadrature with the square wave from divider 17. The outputs of dividers 41 and 17 are compared in a quadrature phase detector 42 which produces a d.c. output having a magnitude and sense dependent upon the average frequency error of VCO 36. Since the half-periods of a square wave cycle from divider 41 are unequal; i.e., the half-period resulting from dividing VCO output frequencies between 9,960–10,440 is shorter than the half-period resulting from dividing VCO output frequencies between 9,960–9,480, detector 42 is a symmetrical circuit which effectively averages the period of square wave from divider 41 in comparing it with the period of square wave from divider 17. The error signal from detector 42 is integrated and applied as a second control input to VCO 36 through summing amplifier 37.

For test purposes, output from crossover detector 39 is applied to a pulsewidth discriminator 44 which recovers the 30 Hz signal due to frequency modulation including any phase errors therein which may have been introduced by converter 34, amplifier 37, VCO 36, filter 38, and detector 39. The demodulated reference signal from discriminator 44 is compared with variable signal from converter 31 in summing amplifier 45, filtered 46 and detected in quadrature phase detector 47 which produces a d.c. output measurable on meter 48.

The error indicated on meter 48 may be adjusted to within 0.01° of absolute by a manual tuning adjustment on converter 31, which may comprise a 30 Hz tracking filter as described in copending application Ser. No. 308,393, filed Nov. 21, 1972 now U.S. Pat. No. 3,792,473 by J. J. Sawicki for "VOR Receiver with Adaptive Filter and Phase Shifter for Improved Accuracy."

The deviation ratio is measured in circuit 51. Output from divider 41 is supplied to a pulsewidth subtractor 52 which also receives $f_r \angle 90°$ from divider 18. Because of the quadrature shift in phase resulting from frequency modulation, the square waves applied to subtractor 52 are in phase. However, the square wave, from divider 41 is unbalanced since divider 41 reaches a count of 166, corresponding to one-half cycle of output, more rapidly during the positive, or advancing frequency, half modulation cycle than during the negative, or retarding frequency, half modulation cycle. The difference in duration between the longer positive half-cycle square wave from divider 18 and the shorter positive half-cycle square wave from divider 41 is therefore a measure of the frequency deviation of VCO 36. This difference is evaluated by enabling an AND gate 53 for the time difference between the positive half-cycle inputs to subtractor 52. 4.32 MHz clock pulses from oscillator 10 are thereupon passed to a binary counter 54. The count accumulated in counter 54 during the measurement period is read into a comparator which is preset to the binary equivalent of 2,200 corresponding, as will later be shown, to a deviation ratio of 16. Comparator 55 controls a storage register 56 having indicating lamps 57, 58 which show by the illumination of one or the other a high or low deviation ratio depending on whether the output of counter 54 is greater or less than 2,200, or, by the illumination of both, a correct deviation ratio.

The runout monitor 60 detects errors in phasing of the reference and variable signals of the composite signal originating internally of the generator for all values of selected bearing or the sum of such errors and any additional errors originating in an external r.f. signal generator 61 which the composite output of summing amplifier 32 modulates. A composite signal similar to the output of amplifier 32 is provided in summing amplifier 62 which combines 9,960 Hz signals from filter 38 with 30 Hz variable signal from converter 31. The output of amplifier 62 differs from that of amplifier 32 only in that the latter includes a 1,020 Hz signal from oscillator 63 which simulates the tone identification used in VOR transmitters. R.F. generator 61 includes a demodulator from which composite signal is returned to the runout monitor through a buffer amplifier 64. A selector switch 65 connects monitor 60 either to amplifier 62 for measurement of internal error alone or to amplifier 64 for measurement of internal error plus the additional error introduced by generator 61. The composite signal from switch 65 is applied to a 9,960 Hz limiter demodulator 66 which includes a pulsewidth discriminator similar to discriminator 44 preceded by a limiter amplifier. The output of demodulator 66, filtering 67, is a 30 Hz sine wave which, absent error, is precisely in quadrature with the square wave output of divider 17. Any departure between this phase relationship is detected in a quadrature phase detector 68 and presented as a direct voltage input proportional to the phase error to a summing amplifier 69. The 30 Hz a.m. component of composite signal at switch 65 is separated by a filter 71 and compared in a quadrature phase detector 72 with the 30 Hz $f_v$ square wave from switch 29. Any difference between a quadrature phase relationship between these two signals produces a direct voltage proportional to the phase error which is also applied to summing amplifier 69. The output of amplifier 69 controls phase shifter 33 so as to introduce, when switch 65a is in the external position, a compensating phase shift in the $f_v$ component, tending to drive the total error to zero. The output of amplifier 69 is also displayed on meter 48 which is calibrated to indicate the error of the system in hundredths of a degree.

As noted above, comparator 55 in the deviation ratio measuring circuit 51 is set to compare the count stored in counter 54 with 2,200 to indicate deviation ratios above or below the value of 16. The number to which comparator 55 is set is determined as follows:

The instantaneous frequency $\omega(t)$ of the output of VCO 36 is $$\omega(t) = 2\pi 9{,}960 + 2\pi \cdot 30 \cdot \beta \sin 2\pi \cdot 30t \quad (1)$$

$$\beta = 16$$

The total phase $\phi(t)$ of the output is $$\phi(t) = \int \omega(t) = 2\pi \cdot 9{,}960t - 16 \cos 2\pi 30t + C \quad (2)$$

$$C = 16$$

Dividing equation (2) by $2\pi$ yields $N_c$, the number of cycles of output from VCO 36 in the interval $t$.

$$N_c = 9{,}960t - (16/2\pi) \cos 2\pi\, 30t + (16/2\pi) \quad (3)$$

One half cycle of output of divider 41 occurs when 166 cycles have been generated by VCO 36. Therefore, allowing $N_c = 166$ and solving equation (3) for $t$ by iteration, the result $t = 16.1565 \times 10^{-3}$ sec. is obtained. The half-period of 30 Hz applied to subtractor 52 is $16.6667 \times 10^{-3}$ sec. Therefore, the width of the pulse from subtractor 52 is $510.2\mu$ and approximately 2,200 pulses from oscillator 10 will pass through gate 53 in this interval.

Figures 2, 4, 5:
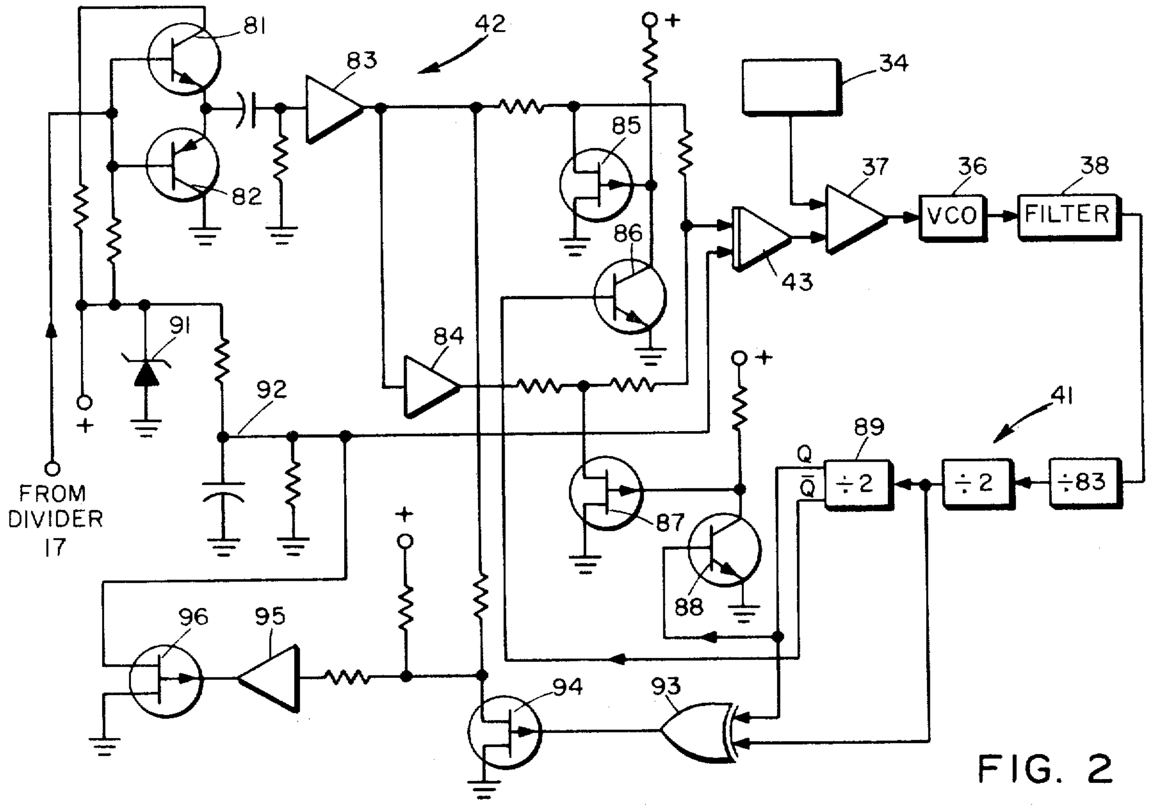

The 9,960 Hz generator 35 is shown in greater detail in FIG. 2, to which reference is now made. Phase detector 42 includes an input amplifier comprising complementary transistors 81, 82 wherein 30 Hz square wave $f_r$ from divider 17 is converted to a bipolar square wave. The bipolar square wave is amplified in amplifiers 83, 84. Amplifier 84 is fed from the output of amplifier 83, thus providing at the outputs of these amplifiers two bipolar square waves, one of which is in phase with the reference signal, $f_r$, and the other of which is 180° out of phase therewith. Output from amplifier 83 is fed to integrator 43 through a switching network which includes transistors 85, 86. A similar network including transistors 87, 88 interrupts the square wave from amplifier 84 applied to integrator 43. Oppositely phased 30 Hz signals are obtained from the complementary outputs Q, $\overline{Q}$ of the final stage 89 of divider 41. These signals control transistors 86 and 88, causing transistors 85 and 87 alternately to short to ground signals from amplifiers 83 and 84. Nominally, the outputs of stage 89 are in quadrature with the outputs of amplifiers 83 and 84 causing the chopped inputs to integrator 43 to be positively and negatively balanced, thus resulting in zero d.c. output from integrator 43. If the outputs of stage 89 depart from quadrature phase relationship, as would occur when their frequency changed from 30 Hz, the inputs to integrator 43 become unbalanced and a d.c. output from the integrator appears of the proper sense to change the frequency of VCO 36 to that required to produce 30 Hz output from stage 89. Because of the frequency modulation of VCO 36 caused by injection of signal from converter 34, each of the signals from the outputs Q and $\overline{Q}$ of stage 89 have half-cycles of unequal duration. This causes an unbalance between the chopped inputs to integrator 43 tending to produce a small d.c. bias at the output. This bias is normally balanced out by a fixed compensating bias derived from Zener diode 91 and voltage divider 92. To speed phase locking of VCO 36 from $f_r$ the compensating bias supplied by voltage divider 92 to integrator 43 is removed during such time as VCO 36 is not properly phase locked to $f_r$.

Output C from stage 89 is combined with the 60 Hz input thereto in an Exclusive OR gate 93. The action of gate 93 is to shift the phase of the 30 Hz signal applied thereto by 90°. Under phase lock conditions this 30 Hz signal applied to the gate of transistor 94 is 180° out of phase with the 30 Hz signal from amplifier 83 applied to the drain thereof. Amplifier 95 then biases switching transistor 96 non-conductive allowing normal application of compensating bias to integrator 43. If the phase lock of VCO 36 is broken anti-phase voltages are no longer applied to transistor 94 with the result that transistor 96 is switched into conduction, short-circuiting compensating bias to integrator 43, allowing the integrator more rapidly to build up a corrective output.

Figure 3:
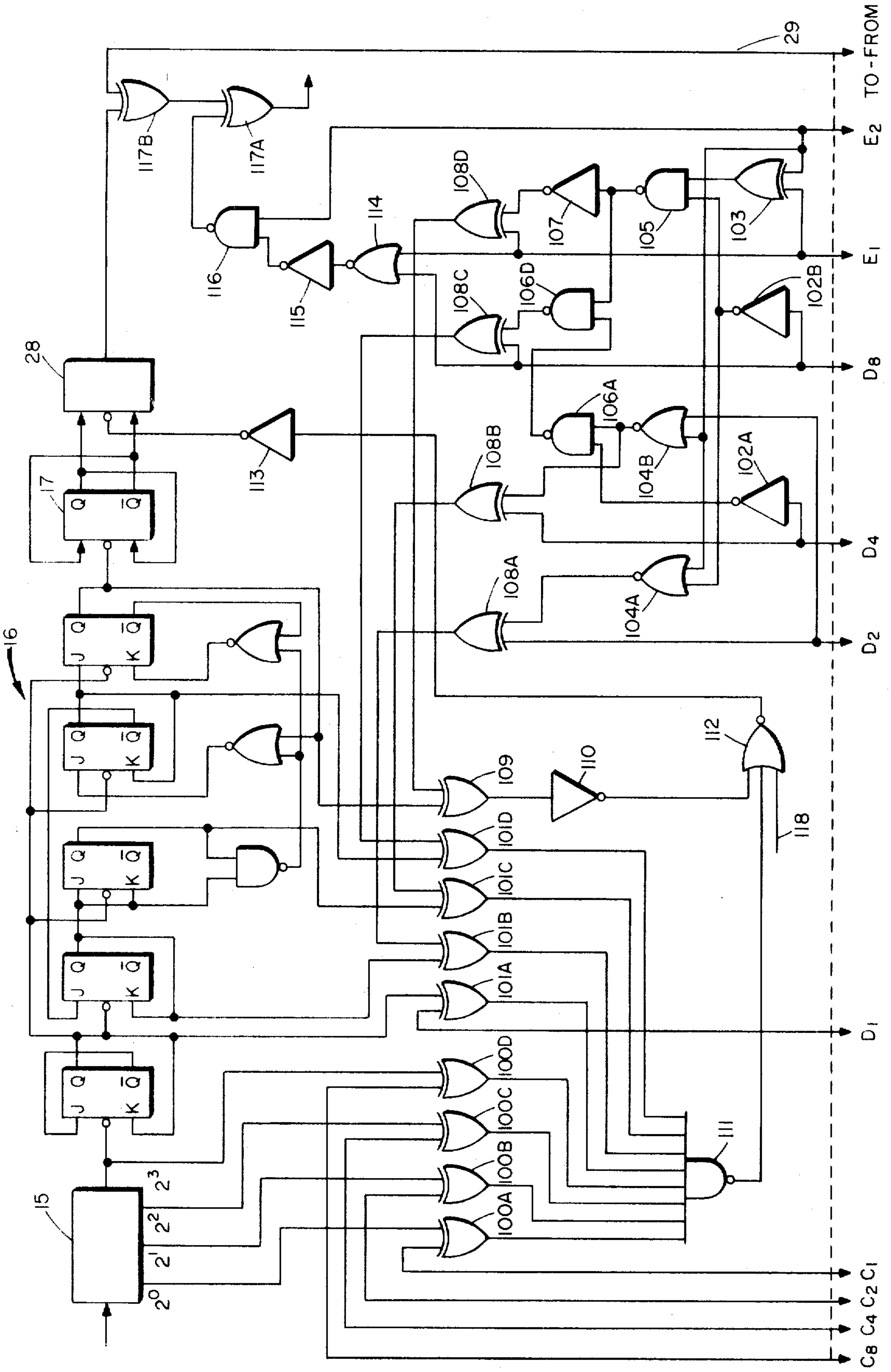
FIG. 3 is a functional block diagram of a portion of the digital phase shifter used in the invention.

The divider circuits 15, 16, comparators 25, 26 and logic 27 of FIG. 1 are shown in greater detail in FIG. 3 as comprising combinations of J-K flip flops and conventional logic gates such as AND, NOR and Exclusive OR. The four output lines of each segment of switch 22 provide the selected decimal digit of each segment in the form of a complemented binary coded decimal. These lines are identified, commencing with the least significant digit as $A_1$, $A_2$, $A_4$, $A_8$ and ending with the most significant digit as $E_1$, $E_2$. For example, the A lines connected to the 0.01° segment of switch 22 are respectively at logic levels 1111 for a switch position of 0.00°. If the switch position is 0.05° these levels change to 0101, respectively. FIG. 3 begins at divider 15 and continues through register 28, since these are the portions of the circuit which must recognize whether a phase angle greater or less than 180° has been selected and function accordingly. Lines $C_1$, $C_2$, $C_4$, $C_8$ are each connected from the units segment of switch 22 to Exclusive OR gates 100A–100D. Each of these gates also receives an input from the individual stages containing the binary count of divider 15. The latter lines are identified as $2^0$, $2^1$, $2^2$ and $2^3$. At count zero the state of these lines is 0000. As count is accumulated the lines assume the normal binary state, for example, after five input pulses the lines are respectively at 1010; after nine input pulses the lines are at 1001; after 10 input pulses all lines are reset to 0000. The outputs of gates 100A–100D are combined in NAND gate 111. Neglecting for the moment the other inputs to gate 111, if the units segment of switch 22 was set to 0°, lines $C_1$–$C_8$ would be at 1111, lines $2^0$–$2^3$ would be at 0000, resulting in outputs from gates 100A–100D of 1111, enabling gate 111. If the units segment of switch 22 is set to 5°, lines $C_1$–$C_8$ are at 0101 resulting in outputs from gates 100A–100D of 0101. After five input pulses to divider 15 lines $2^0$–$2^3$ are at 1010, changing the outputs of gates 100A–100D to 1111, enabling gate 111 and introducing delay equivalent to 5° phase shift. The logic and dividers for the tenths and hundredths phase angle selector operate in a manner identical to that just described for the units selector. These less significant digits are combined in a NAND gate and present a 0 input on line 118 to NOR gate 112 when delay equivalent to the selected tenths and hundredths of a degree is accumulated.

Divider 16 comprises five J-K flip flops with feedback connections as shown to provide reset after the application of 18 pulses thereto. Connections from successive stages of divider 16 are made to Exclusive OR gates 101A–101D and 109. FIG. 5 is a truth table showing the states of the inputs to these gates for 18 successive input pulses to divider 16. As previously described, whenever a phase angle of 180° or greater is selected on switch 22 the $f_v$ signal is generated by delaying $f_r$ an amount equivalent to the difference between the selected angle and 180° and inverting the same to provide total phase displacement between $f_r$ and $f_v$ equal to the selected phase angle. The logic next to be described performs this function.

Line $D_1$ is connected to Exclusive OR 101A, the other input thereto being from the first stage of divider 16. Line $D_2$ is connected to Exclusive OR 108A and NOR 104B. Line $D_4$ is connected to inverter 102A and Exclusive OR 108B. Line $D_8$ is connected to Exclusive OR 106C, inverter 102B and NOR 114. Line $E_1$ is connected to Exclusive OR 103 and 108D and NOR 114. Line $E_2$ is connected to Exclusive OR 103, NOR 104A and 104B and NAND 116. The output of inverter 102B is connected to NOR 104A and NAND 105, the latter also receiving the output of Exclusive OR 103. The outputs of NORs 104A and 104B respectively furnish the second inputs to Exclusive ORs 108A and 108B. The output of inverter 102A is combined with the output of NOR 104B in NAND 106A. The outputs of NANDs 106A and 105 are combined in NAND 106B which furnishes the second input to Exclusive OR 108C. The output of NAND 105 is inverted, 107, and applied as the second input to Exclusive OR 108D. Exclusive ORs 108A–108D respectively control Exclusive ORs 101B–101D and 109. The output of NOR 114 is inverted, 115, and combined with $E_2$ in NAND 116 which controls Exclusive OR 117A. The output of register 28 is connected through Exclusive OR 117B as the second input to Exclusive OR 117A. A connection from the TO-FROM selector switch 29 is made as the second input to Exclusive OR 117B. In the FROM position of switch 29 the input therefrom to Exclusive OR 117B is at 0 level, resulting in passage of output from register 28 to gate 117A without inversion. The inverted, 113, output of NOR 112 triggers register 28.

The operation of the circuit just described is best explained with the aid of the truth tables of FIGS. 4, 5 and 6. FIG. 4 shows the D and E outputs of switch 22 for representative values of selected phase angle. For 0°, for example, all D and E lines are at level 1. At 70° lines $D_1$, $D_2$ and $D_4$ are complemented, while lines $D_8$, $E_1$ and $E_2$ remain at level 1. FIG. 6 traces the effect of the D and E states on the gates ennumerated there. The output of gate 102A is the complement of $D_4$. The output of gate 102B is the complement of $D_8$. For 70° $D_4$ is 1 and $D_8$ is 0, causing the outputs of gates 102A and 102B to be respectively 1 and 0 as indicated in FIG. 6. Following along the 70° column it will be seen that gates 101A–101D and 109 have outputs respectively of 00011. Referring to FIG. 5, it will be seen that seven input pulses are required to shift gates 101A–101C all to 1 outputs and thus result in inputs to gate 112 of 0 from gate 110 and 0 from gate 111. Further along the 70° column it will be noted than the output of gate 117A is 0, thus resulting in non-inversion of output of register 28.

For comparison, the angle 250° may be selected. The D and E lines are then respectively 010110. This causes the states of the outputs of gates 101A–101D and 109 to be respectively 00011, identical to the 70° case. Further on the 250° column, however, it will be noted that the output of gate 117A is now 1, resulting in inversion of the output of register 28, thereby adding 180° to the 70° delay of register 28.

Many modifications and variations of the invention are possible in the light of the foregoing teachings, particularly as regards implementation of the logic functions employed therein. The true scope of the invention is therefore to be measured by the appended claims.

The invention claimed is:

1. A signal generator for testing a VOR receiver which receiver provides bearing information by comparing the phase of a variable signal with a reference signal, said reference and variable signals being transmitted to said receiver as a composite signal simultaneously frequency and amplitude modulated, comprising a stable oscillator operating at a frequency which is a high order harmonic of the frequency of said reference signal;

digital means for dividing in multiple stages the frequency of said stable oscillator to the frequency of said reference signal;

presettable logic means for detecting accumulation of count by said dividing means corresponding to a selected phase angle between said reference and variable signals;

register means triggered by said logic means and settable upon receipt of trigger from said logic means to the relative polarity at the instant of triggering of the output of said dividing means;

a subcarrier generator providing an output having a frequency substantially higher than the frequency of said reference signal;

means for modulating the frequency of subcarrier output from said subcarrier generator by output from said dividing means;

means for modulating the amplitude of said frequency modulated subcarrier output by output from said register means to provide a composite signal; and means for applying said composite signal to the VOR receiver to be tested.

2. A signal generator as claimed in claim 1 wherein the outputs of said dividing means and said register means are of square waveform and with additionally, means for converting output of said dividing means into sine waveform for modulating the frequency of said subcarrier; and means for converting the output of said register means to sine waveform for modulating the amplitude of said frequency modulated subcarrier.

3. A signal generator as claimed in claim 1 wherein said subcarrier generator and means for modulating the frequency thereof comprises the combination of a voltage controlled oscillator operating at the frequency of said subcarrier output;

second dividing means for dividing the frequency of output of said voltage controlled oscillator by a fixed number substantially to the frequency of output of said first named dividing means;

means for comparing the phase of output from said second dividing means with output from said first named dividing means; and means for combining output from said phase comparing means with output from said first named dividing means to provide control voltage for said voltage controlled oscillator.

4. A signal generator as claimed in claim 3, with additionally, means for measuring the deviation ratio of said frequency modulated subcarrier output, including means for comparing the time duration of a fractional part of one cycle of output from said second dividing means with the time duration of a similar fractional part of one cycle of output from said first named dividing means.

5. A signal generator as claimed in claim 1, with additionally, means receiving said composite signal and recovering therefrom the information signal conveyed by the frequency modulation thereof and the information conveyed by the amplitude modulation thereof;

means for comparing the phase of said information signal recovered from frequency modulation with the output of said dividing means to provide a first phase error output;

means for comparing the phase of said information signal recovered from amplitude modulation with the output of said register means to provide a second phase error output; and means for combining said first and second phase error outputs to provide a total phase error output.

6. A signal generator as claimed in claim 5, with additionally, a voltage controlled phase shifter for shifting the phase of output from said register means prior to the utilization of said register output in said means for modulating amplitude, said phase shifter receiving said total phase error output as control voltage.

7. A signal generator for testing a VOR receiver which receiver provides bearing information by comparing the phase of variable signal with a reference signal, said reference and variable signals being transmitted to said receiver as a composite signal simultaneously frequency and amplitude modulated, comprising, a stable oscillator operating at a frequency which is a high order harmonic of the frequency of said reference signal;

digital means for dividing in successive stages the frequency of said stable oscillator output to provide an output corresponding to said reference signal;

a phase selector switch settable to an angle at which the bearing angle indicated by said receiver is to be tested, said switch providing an output which is the binary coded decimal of the phase angle set thereon;

logic circuits connected between said switch and stages of said dividing means with the least significant digit of output from said switch controlling the logic circuit connected to a stage of said dividing means nearest the input thereto from said stable oscillator and outputs from said switch representing more significant digits of selected phase angle being connected to successive stages of said dividing means in ascending order of significance;

register means controlled by said logic circuits, saud register means having a capacity of a single bit of said reference signal output from said dividing means and providing an output corresponding to said variable signal, said register being cycled by said logic means upon accumulation of count by said dividing means equivalent to the phase angle selected on said switch;

a subcarrier generator providing an output having a frequency substantially higher than said reference frequency output;

means for frequency modulating said subcarrier output by said reference frequency output;

means for modulating the amplitude of said frequency modulated subcarrier by said variable signal output of said register means to provide a composite signal; and means for applying said composite signal to the VOR receiver to be tested.

8. A signal generator as claimed in claim 7 wherein said logic means are arranged to cycle said register means after accumulation of count by said dividing means corresponding to the phase angle selected on said switch when the selected angle is less than 180° and is arranged to cycle said register after accumulation of count by said dividing means corresponding to the difference between the selected angle and 180° when the selected angle is 180° or greater.

9. A signal generator as claimed in claim 8 wherein said logic means control said register to produce an output of the same polarity as said reference signal output from said dividing means when the selected angle is less than 180° and to produce an output of opposite polarity to said reference signal output when the selected angle is 180° or greater.

10. A signal generator as claimed in claim 7 wherein said subcarrier generator and means for modulating the frequency thereof comprises a voltage controlled oscillator operating at the frequency of said subcarrier output;

second dividing means for dividing the frequency of output of said voltage controlled oscillator by a fixed number substantially to the frequency of said reference signal output from said first named dividing means, means for comparing the phase of output from said second dividing means with said reference signal output;

means for integrating with respect to time the output from said phase comparing means;

means providing a fixed bias output; and means for combining said reference signal output, said fixed bias output and output of said integrating means to provide control voltage for said voltage controlled oscillator.

11. A signal generator as claimed in claim 10 with additionally means for measuring the deviation ratio of said frequency modulated subcarrier output, including a pulsewidth subtractor providing an output related to the difference between the periods of one-half cycle of output from said second dividing means and one-half cycle of said reference signal output;

a clock oscillator;

means controlled by said pulsewidth subtractor for storing pulses from said clock oscillator; and means for indicating the number of said clock pulses contained by said storing means.

12. A signal generator as claimed in claim 7, with additionally, means for determining phase error in said composite signal, including means receiving said composite signal and demodulating the same to provide recovered reference and variable signals;

means for comparing the phase of said recovered reference signal with said reference signal output to provide a first phase error signal;

means for comparing the phase of said recovered variable signal with said variable signal output to provide a second phase error signal;

means for combining said first and second phase error signals to provide a total phase error signal; and means for quantitatively indicating said total phase error signal.

13. A signal generator as claimed in claim 12 with additionally a voltage controlled phase shifter effective to shift the phase relationship between said reference signal output and said variable signal output prior to utilization of said reference and variable signal outputs in said frequency and amplitude modulation means; and means applying said total phase error signal as control voltage to said phase shifter to cause said phase shifter to reduce the total phase error.

* * * * *